Jan. 3, 1961  J. MUELLER ET AL  2,967,063
RIGID AXLE FOR MOTOR VEHICLES
Filed July 22, 1957  3 Sheets-Sheet 2
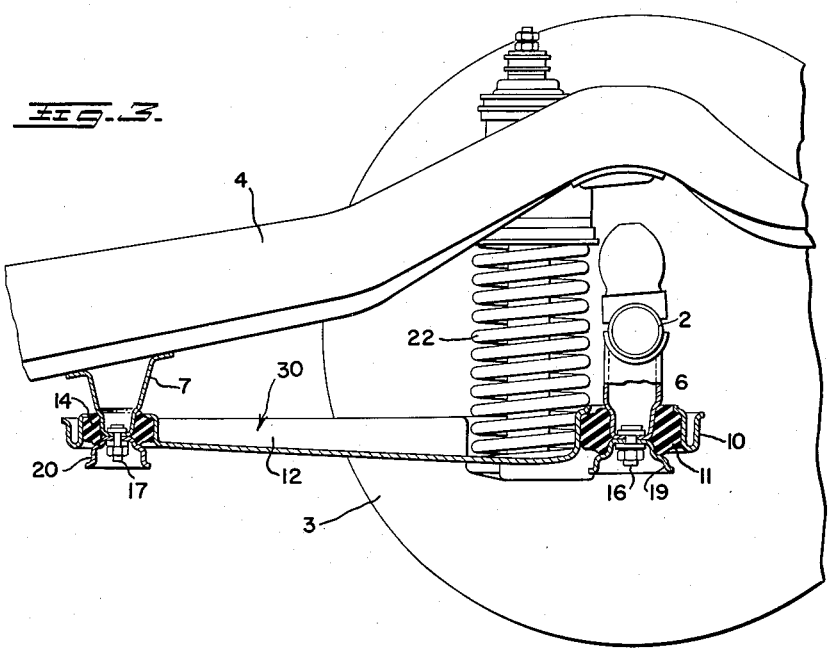
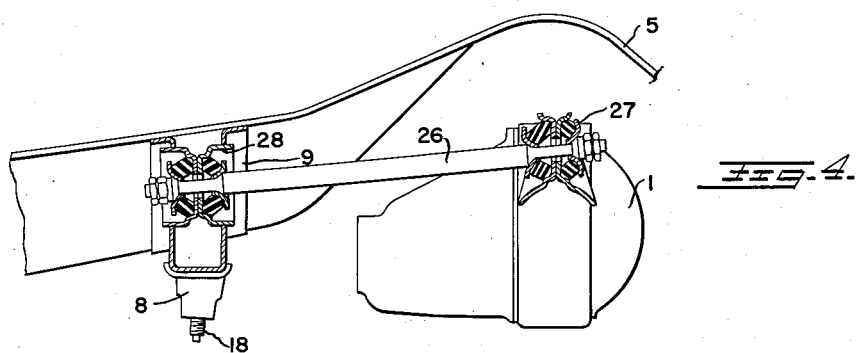
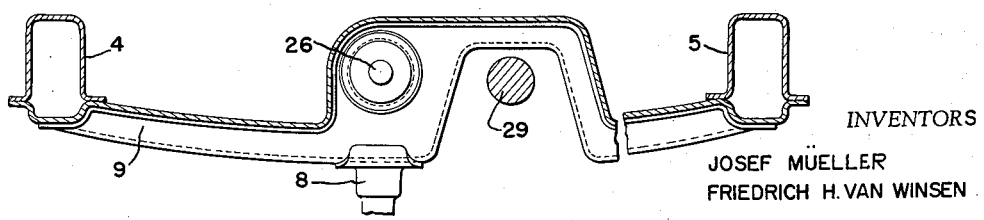
INVENTORS
JOSEF MÜELLER
FRIEDRICH H. VAN WINSEN
BY *Dirke and Craig*
ATTORNEYS

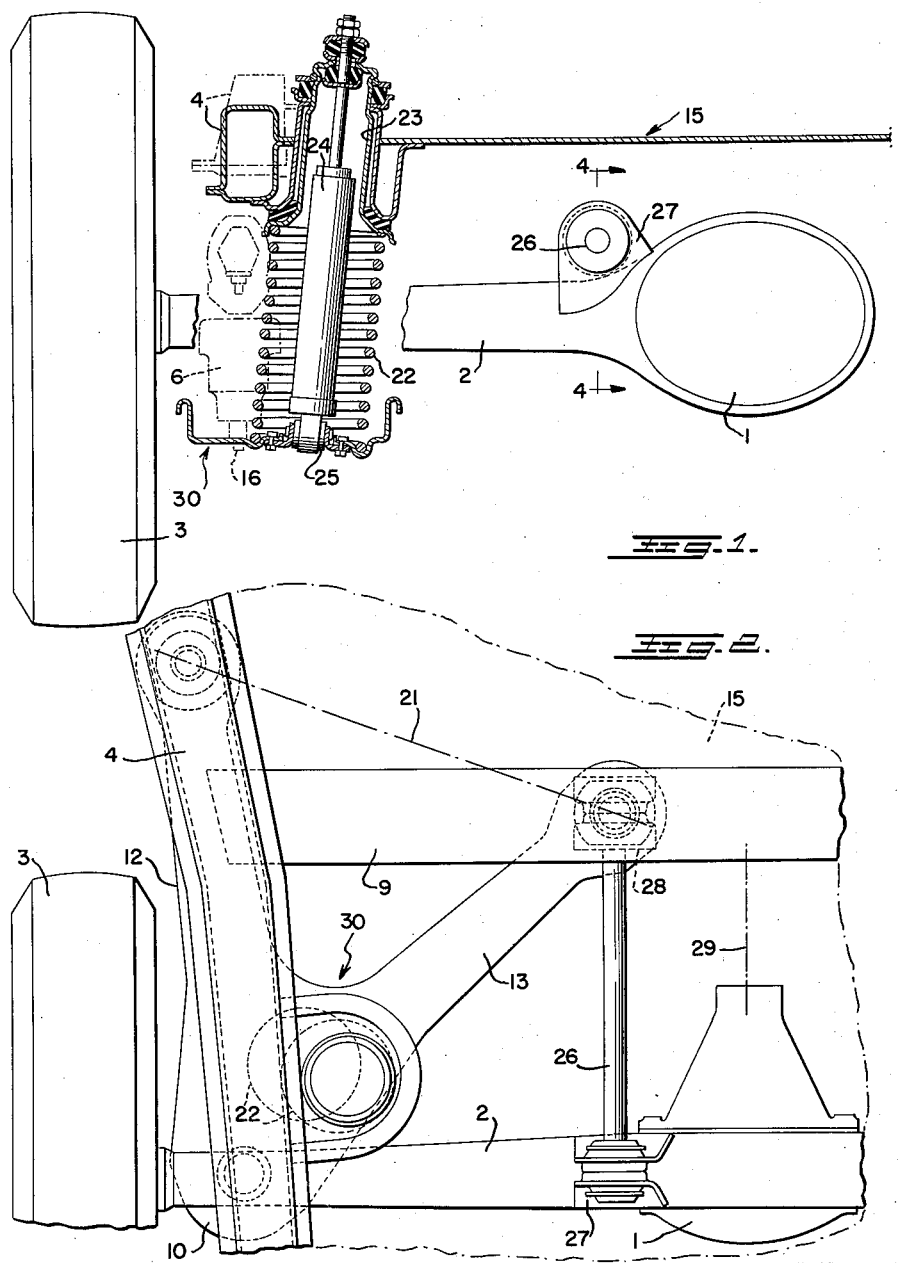

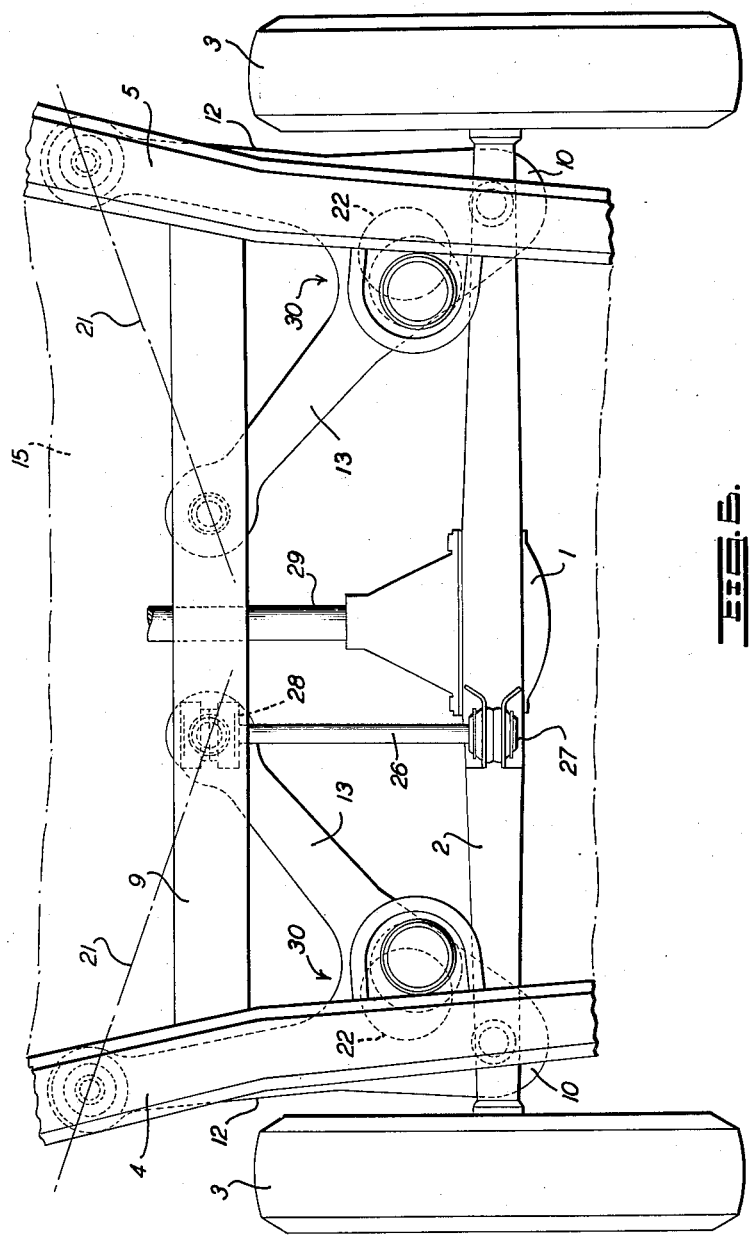

United States Patent Office

2,967,063
Patented Jan. 3, 1961

2,967,063

RIGID AXLE FOR MOTOR VEHICLES

Josef Mueller, Stuttgart-Riedenberg, and Friedrich H. van Winsen, Kirchheim-Teck, Germany, assignors to Daimler-Benz Aktiengesellschaft, Stuttgart-Unterturkheim, Germany Filed July 22, 1957, Ser. No. 673,300

Claims priority, application Germany Aug. 20, 1956

11 Claims. (Cl. 280—124)

The present invention relates to a rigid axle for motor vehicles in which the frame on each side of the motor vehicle longitudinal center plane is connected with the rear axle bridge member by means of a longitudinal guide member. According to the present invention, each of the two guide members is so shaped and constructed and so secured to the vehicle parts that it is able to absorb not only the longitudinal forces but also the transverse forces occurring thereat.

In a particular embodiment according to the present invention the longitudinal guide member is constructed in a triangular or fork-shaped manner and is pivotally connected at the apex portion thereof in proximity to the rear wheel, preferably up to a certain degree universally resiliently and pivotally at the lower side of the rear axle bridge member. One of the two leg or arm portions of the longitudinal guide member is thereby disposed toward the outside and is pivotally secured with the free end thereof at the longitudinal frame member in the same manner as in the apex portion thereof. The second leg or arm portion of the longitudinal guide member is directed toward the motor vehicle longitudinal center plane and is also pivotally connected with the free end thereof at a rigid frame part, for example, at a frame cross member, in the same manner as both the apex portion thereof and the free end of the outwardly disposed arm portion.

The longitudinal guide member is preferably so constructed that a helical coil spring supported at the upper end thereof against a part rigidly connected with the vehicle frame is supported with the lower end thereof on the longitudinal guide member in such a manner as to be disposed thereby inwardly of the frame longitudinal member.

As a result of the connection of the apex portion of the longitudinal guide member at the rear axle bridge member and of the two free ends thereof at two frame parts separated from each other a substantial distance in the transverse direction of the vehicle, the longitudinal as well as the transverse forces are effectively absorbed thereby.

For purposes of absorbing the moments occurring during starting, deceleration or braking, thrust struts or brace members are additionally used in accordance with the present invention which are connected, on the one hand, with the rear axle housing and, on the other, with a rigid frame part, for example, with a frame cross member, preferably up to a certain degree universally yieldingly and pivotally.

For purposes of absorbing transverse forces, the use of rod-shaped cross support members is known in the prior art in which the rod is pivotally connected on one side of the vehicle with a frame longitudinal member and on the other side of the vehicle with the rear axle housing. However, if in such a prior art arrangement the rear wheels move toward each other in the vertical direction from the normal positions thereof, then the horizontal distance of the pivot points of the rod-shaped cross support becomes smaller thereby resulting in an asymmetrical guidance of the rear axle.

In contrast thereto, the present invention enables a completely symmetrical axle guidance.

Among other advantages which may be attained in accordance with the present invention, the following may be mentioned:

(1) A low instantaneous center rearwardly;
(2) The possibility of a low construction and arrangement of the frame longitudinal bearer member as a result of the arrangement of the coil spring inwardly of the longitudinal bearer member;
(3) The displacement of the pivotal connection of the longitudinal guide member with the rear axle very far outwardly; and
(4) The possibility of constructing the longitudinal guide member as pressed sheet-metal parts which need neither be welded nor machined.

Accordingly, it is an object of the present invention to provide a suspension and guidance for a rigid axle which absorbs longitudinal as well as transverse forces.

It is another object of the present invention to provide a suspension system for a rigid axle member which enables a completely symmetrical guidance of the axle member.

Another object of the present invention is to provide a longitudinal guide member of special construction which is provided with two arm or leg portions and which is connected with the various parts at three points thereof, preferably universally resiliently up to a certain degree.

Still another object of the present invention is to provide a suspension for a rigid rear axle which enables the disposition of the non-guided coil springs inwardly of the longitudinal frame members.

A further object of the present invention is to provide a suspension and guidance for the rear axle of a motor vehicle which effectively absorbs forces from all directions, i.e., longitudinal as well as transverse forces, and which also favorably absorbs the accelerating, decelerating and braking moments which may be produced by the car.

A still further object of the present invention resides in the provision of a longitudinal guide member which may be constructed of pressed sheet metal parts thereby obviating the need for welding or machining the same.

A still further object of the present invention resides in the provision of a suspension and guidance for the rigid rear axle of a motor vehicle which provides a relatively low instantaneous center rearwardly and which permits the displacement of the pivot points between the longitudinal guide members and the rear axle as far as possible outwardly.

These and other objects, features and advantages of the present invention will become more obvious from the following description when taken in connection with the accompanying drawing, which shows, for purposes of illustration only, one preferred embodiment in accordance with the present invention and wherein:

Figure 1 is a rear view of the left half of the rear axle and suspension therefor in accordance with the present invention, whereby parts of the rear axle, for purposes of illustration of a partial cross-sectional view of the spring suspension disposed in front thereof as seen in the driving direction, are indicated in phantom dot and dash lines;

Figure 2 is a partial plan view of the rear axle suspension in accordance with the present invention shown in Figure 1;

Figure 3 is a side view of the rear portion of the left longitudinal bearer member with its spring suspension and with the arm of the longitudinal guide member disposed outwardly and the connection thereof in cross section;

Figure 4 is a side view, partially in cross section, of the thrust strut or brace member in which, for purposes of clarity, certain parts are omitted;

Figure 5 shows a cross-bearer member in accordance with the present invention provided with means for connecting thereto the free end of the inwardly directed arm portion of the longitudinal guide member and with means for securing thereto the forward end of the thrust rod;

Figure 6 is a plan view, similar to Figure 2, of the rear axle suspension in accordance with the present invention, showing both sides thereof.

Referring now to the drawing, wherein like reference numerals are used throughout the various views to designate like parts, and more particularly to Figures 1 and 2, reference numeral 1 designates the rear axle housing having a rear axle of bridge member 2 for the drive shafts (not shown) of the wheels. The rear axle bridge member 2 is of the rigid type.

The driven left rear wheel is designated with reference numeral 3, the left longitudinal frame bearer member or side member with reference numeral 4, and the right longitudinal frame bearer or side member with reference numeral 5 (Figures 4 and 5).

A lug or support member 6 (Figure 3) is connected to the underside of the rear axle bridge member 2. A second lug or support member 7 (Figure 3) is secured to the underside of the longitudinal side frame member 4 and a third lug or support member 8 (Figure 4) is connected to the underside of the cross bearer member 9 (Figures 2, 4 and 5).

A fork-shaped longitudinal guide member generally designated by reference numeral 30 is connected at the apex portion 10 thereof with the lug 6 by means of a rubber ring 11 so as to provide a limited universal yieldingness in the joint, i.e., to be resilient in all directions. The outwardly directed arm portion 12 of the longitudinal guide member 30 is supported universally resiliently on the lug 7 at the longitudinal side member 4 by means of a rubber ring 14. A similar support, the details of which are not shown in Figure 4, is provided on the lug 8 at the cross bearer member 9 for the inwardy directed arm portion 13 of the longitudinal guide member 30.

The apex portion 10 as well as the outwardly disposed arm portion 12 and the inwardly disposed arm portion 13 of the longitudinal guide member 30 are secured at the lugs 6, 7 and 8, respectively, by means of bell-shaped parts or retainer cups 19 and 20 secured thereto by means of bolted connections 16, 17 and 18. During relative movement between the rear axle 2 and the vehicle frame, the fork-shaped longitudinal guide member 30 may pivot about an axis 21 (Figure 2) extending through the points of elastic connection of the arms 12 and 13 thereof. The pivot axes 21 (Figures 2 and 6) thereby extend at an acute angle with respect to both a longitudinal vertical plane and a transverse vertical plane through the vehicle. By reason of the connection of the apex portion 10 at the rear axle bridge member 2 and of the arm portion 12 at the longitudinal side frame member 4, the longitudinal forces are absorbed in an effective manner whereas the connection of the other arm portion 13 of the longitudinal guide member 30 with the cross bearer member 9 enables effective absorption additionally of the transverse forces.

The apex portion 10 of the longitudinal guide member 30 extends so far beyond the inner side of the longitudinal bearer member 4 that it forms a spring support for the lower end of the coil spring 22 which is supported at the upper end thereof against a part 23 (Figure 1) which is secured to the inner side of the longitudinal side member 4 and extends through the vehicle floor 15.

A shock absorber 24 extends through the non-guided helical coil spring 22 which shock absorber 24 is connected at the upper end thereof with the bell-shaped part 23 and at the lower end 25 thereof with the apex portion 10 of the longitudinal guide member.

For purposes of absorbing the reaction moment which may occur, for example, during starting, acceleration and braking, a thrust strut or brace member 26 is used in addition to the fork-shaped longitudinal guide member which thrust strut or brace 26 is pivotally secured at 27 to the rear axle housing 1 and at 28 with the cross bearer member 9 by means of rubber bearings which provide universal resiliency to a certain degree and enable pivotal movement. The lug 8 for the inwardly directed arm 13 of the longitudinal guide member is arranged below the place 28 of the bearing for the thrust strut or brace member 26.

The cross bearer member 9 is provided with an offset portion for purposes of enabling upward and downward movement of the drive or Cardan shaft 29.

The longitudinal guide member disposed on the right-hand vehicle side, which is not shown in the drawing, is constructed exactly as that on the left-hand vehicle side and is arranged in a similar manner so that a specific description thereof may be dispensed with herein.

Even though only a single thrust strut or brace member 26 is described, two thrust struts or brace members of similar construction may be used in a similar manner and may be symmetrically arranged on each of the two vehicle sides.

Furthermore, the longitudinal guide member 30 may be directed rearwardly and may be connected at the free end thereof with rigid frame parts, such as longitudinal bearer and cross bearer member.

As a result of the connection of the apex portion 10 of the longitudinal guide member 30 at the rear axle 2 and of the free ends of the two arm portions 12 and 13 thereof at two points spaced from each other in the vehicle transverse direction the longitudinal as well as the transverse forces are effectively absorbed thereby.

While we have shown and described one preferred embodiment in accordance with the present invention, it is understood that the same is not limited thereto but is susceptible of various changes and modifications within the scope of the present invention and we intend to cover all such changes and modifications as encompassed by the appended claims.

We claim:

1. A suspension system for suspending a rigid axle at the vehicle frame including a longitudinal side frame member on each side of the vehicle, comprising one longitudinal fork-shaped guide member on each side of the vehicle central longitudinal plane and having a first and a second fork arm portion and an apex portion, means connecting each of said guide members at the apex portion thereof to said axle, means connecting each of said fork arm portions of each guide member to said frame, said frame including a frame cross member, said last-mentioned connecting means connecting said second fork arm portion to said cross frame member while each of said first fork arm portions is connected to a respective one of said longitudinal frame members, said rigid axle including an axle housing, thrust means interconnecting said rigid axle with said vehicle frame disposed in close proximity to said axle housing, the points of connection formed by said connecting means between a respective first fork arm portion and a corresponding longitudinal frame member and the second fork arm portion of the same guide member with said cross frame members being so disposed in relation to each other that a line connecting the two forms an angle with a longitudinal plane of the vehicle and effectively constitutes a pivot axis for said fork-shaped guide member.

2. A suspension system for suspending a rigid axle at the vehicle frame according to claim 1, wherein each of said connecting means includes lug means and elastic rubber rings intermediate the respective frame part and lug means.

3. A suspension system for suspending a rigid axle at the vehicle frame according to claim 1, wherein said connecting means include rubber ring means, bell-shaped support means to retain said rubber ring means and threaded connecting means for securing said bell-shaped retaining means from below.

4. A suspension system for suspending a rigid axle at the vehicle frame according to claim 1, wherein said frame includes a cross frame member, and wherein said thrust means is connected at one end thereof to said axle and at the other end thereof to said cross frame member, said cross frame member being offset adjacent the connection of said other end of said thrust means therewith.

5. A suspension system for suspending a rigid axle at the vehicle frame according to claim 1, wherein said apex portion extends inwardly beyond said side frame member in the direction of said longitudinal central plane and forms a spring supporting surface, a coil spring supported at the lower end against said spring supporting surface and at the other end against a part of said frame.

6. A suspension system for suspending a rigid axle at the vehicle frame according to claim 5, wherein said coil spring is of the non-guided type, and further comprising a shock absorber extending through said coil spring supported at the lower end on said apex portion and at the upper end against said frame part.

7. A suspension system for suspending a rigid axle at the vehicle frame according to claim 1, wherein said means for connecting said thrust means to said rigid axle lies in a plane above said first-mentioned connecting means.

8. A suspension system for suspending a rigid axle at the vehicle frame according to claim 7, wherein all of said connecting means enable limited universal yielding movement.

9. A suspension system for suspending a rigid axle at the vehicle frame according to claim 8, wherein one of said fork arm portions and said other end of said thrust means are connected to said cross frame member.

10. A suspension system for suspending a rigid axle at the vehicle frame including a longitudinal side frame member on each side of the vehicle, comprising one longitudinal fork-shaped guide member disposed on each side of the vehicle central longitudinal plane and having a first and a second fork arm portion and an apex portion, means connecting each of said guide members at the apex portion thereof to said axle from below thereof, means connecting each of said fork arm portions of each guide member to said frame, all of said connecting means including elastic means enabling limited universal yielding movements, said frame including a frame cross member, said second-mentioned connecting means connecting said second fork arm portion to said cross frame member while said first fork arm portion is connected to a respective one of said longitudinal frame members, the points of connection of a respective first fork arm portion with a corresponding longitudinal frame member and of a respective second fork arm portion with said cross frame member being so disposed in relation to each other that a line connecting the two points of correction forms an angle with a vertical transverse plane of the vehicle and constitutes a pivoting axis for said fork-shaped guide member, said rigid axle including an axle housing, a single thrust means extending substantially parallel to said central longitudinal plane and being disposed in close proximity to said axle housing to one side thereof, and means for connecting said thrust means to said rigid axle and to said frame.

11. A suspension system for suspending a rigid axle at the vehicle frame including a longitudinal side frame member on each side of the vehicle and a reinforcing member connecting said longitudinal side frame members, comprising two longitudinal fork-shaped guide members each having a first and a second fork arm portion and an apex portion at the point of intersection of said first and second fork arm portions, one longitudinal fork-shaped guide member being provided on each side of the vehicle central longitudinal plane, means operatively connecting each of said guide members at the apex portion thereof to said axle, and means operatively connecting each of said fork arm portions of each guide member to said frame, said last-mentioned connecting means providing points of connection for the first and second fork arm portion of each guide member with a respective longitudinal side frame member and said reinforcing frame member which are spaced from each other in both the longitudinal and transverse directions of the vehicle so that the effective pivot axis of said fork-shaped guide member extends in non-parallel relationship with respect to both a transverse and a longitudinal axis of the vehicle.

References Cited in the file of this patent

UNITED STATES PATENTS

| 2,017,316 | Leighton | Oct. 15, 1935 |
| 2,236,410 | Leighton | Mar. 25, 1941 |
| 2,297,591 | Urich | Sept. 29, 1942 |
| 2,300,844 | Olley | Nov. 3, 1942 |
| 2,323,007 | Borgward | June 29, 1943 |
| 2,367,817 | Brown | Jan. 23, 1945 |
| 2,757,016 | Adloff | July 31, 1956 |
| 2,806,713 | Muller | Sept. 17, 1957 |

FOREIGN PATENTS

| 1,139,862 | France | Feb. 25, 1957 |
| 434,311 | Italy | Apr. 24, 1948 |